United States Patent
Ono et al.

(10) Patent No.: US 6,576,157 B2
(45) Date of Patent: Jun. 10, 2003

(54) VACUUM ULTRAVIOLET RAY-EXCITED LIGHT-EMITTING PHOSPHOR

(75) Inventors: Keiji Ono, Tsukuba (JP); Susumu Miyazaki, Ibaraki (JP)

(73) Assignee: Sumitomo Chemical Company, Limited, Osaka (JP)

( * ) Notice: Subject to any disclaimer, the term of this patent is extended or adjusted under 35 U.S.C. 154(b) by 114 days.

(21) Appl. No.: 09/818,539

(22) Filed: Mar. 28, 2001

(65) Prior Publication Data
US 2002/0000538 A1 Jan. 3, 2002

(30) Foreign Application Priority Data

Apr. 6, 2000 (JP) .......................................... 2000-104438

(51) Int. Cl.$^7$ ............................................... C09K 11/08
(52) U.S. Cl. ................. 252/301.4 R; 313/582; 313/584; 313/495; 313/486
(58) Field of Search ................... 252/301.4 R; 313/582, 313/584, 495, 486

(56) References Cited

U.S. PATENT DOCUMENTS 6,045,721 A * 4/2000 Zachau et al. ........ 252/301.4 R

FOREIGN PATENT DOCUMENTS

JP 2000-226574 8/2000

\* cited by examiner

*Primary Examiner*—C. Melissa Koslow
(74) *Attorney, Agent, or Firm*—Sughrue Mion, PLLC

(57) ABSTRACT

A vacuum ultraviolet ray-excited light-emitting phosphor comprising a compound represented by formula $(Ba_xM_{1-x})_{1-0.25y}Mg_{1-y}Al_{10+y}O_{17+0.25y}$ as a substrate, and Eu as an activator, wherein M represents Ca, Sr, or Ca and Sr, x and y satisfy the following relations, $0.5 \leq x \leq 1$, and $0.05 \leq y \leq 0.15$.

4 Claims, No Drawings

VACUUM ULTRAVIOLET RAY-EXCITED LIGHT-EMITTING PHOSPHOR

BACKGROUND OF THE INVENTION

1. Field of the Invention

The present invention relates to a vacuum ultraviolet ray-excited light-emitting phosphor. The present invention also relates to a phosphor suitable for vacuum ultraviolet ray-excited light-emitting devices such as a plasma display panel (hereinafter, abbreviated to as "PDP"), rare gas lamp and the like, and a vacuum ultraviolet ray-excited light-emitting device obtained by using said phosphor.

2. Description of the Related Art

Recently, there are wide-spread developments of vacuum ultraviolet ray-excited light-emitting devices having a mechanism in which a phosphor is excited by vacuum ultraviolet ray radiated by rare gas discharge to emit light. The typical example thereof is a development of PDP. In cathode-ray tubes and color liquid crystal displays, increase in size of images is difficult, on the other hand, PDP is a flat panel display enabling it, and expected to be used for indication or as a large screen television in public spaces. PDP is a display element constituted by placing a large number of fine discharging spaces (hereinafter, sometimes abbreviated as "display cell") into matrix form. A discharge electrode is provided in each display cell and a phosphor is applied on the inner wall of each display cell. A space in each display cell is filled with a rare gas such as He—Xe, Ne—Xe, Ar and the like and by applying voltage on a discharge electrode, discharge occurs in the rare gas and vacuum ultraviolet ray is radiated. The phosphor is excited by this vacuum ultraviolet ray and emits visible ray. Images are displayed by allotting positions of display cells which emit light. By use of phosphors emitting three primary colors, blue, green and red, full color display can be carried out.

As the vacuum ultraviolet ray-excited light-emitting device other than PDP, a rare gas lamp is used. The rare gas lamp is a lamp emitting light by a mechanism in which vacuum ultraviolet ray is generated by discharge in a rare gas, and the vacuum ultraviolet ray is converted into visible ray by a phosphor. Rare gas lamps are noticed from the standpoint of environmental problems since they do not use mercury.

Phosphors excited by vacuum ultraviolet ray radiated by discharge in a rare gas have been already suggested, and as the blue phosphor, $BaMgAl_{10}O_{17}$:Eu is exemplified, as the green phosphor, $Zn_2SiO_4$:Mn is exemplified, and as the redphosphor, $(Y, Gd)BO_3$:Eu is exemplified. For full-color PDP, improvement in brilliance of phosphors is desired. Particularly, improvement in brilliance of a blue phosphor is desired strongly.

SUMMARY OF THE INVENTION

An object of the present invention is to provide a blue phosphor having high light-emitting brilliance for vacuum ultraviolet ray-excited light-emitting devices such as PDP and the like, and a vacuum ultraviolet ray-excited light-emitting device using the same.

The present inventors have intensively studied to solve the above-mentioned problems under such conditions, and resultantly found that the specific aluminate among aluminate-based phosphors containing Eu as an activator is useful as a vacuum ultraviolet ray-excited light-emitting phosphor, particularly as a blue phosphor, and have completed the present invention.

Namely, the present invention provides a vacuum ultraviolet ray-excited light-emitting phosphor comprising a compound represented by formula $(Ba_xM_{1-x})_{1-0.25y}Mg_{1-y}Al_{10+y}O_{17+0.25y}$ as a substrate, and Eu as an activator, wherein M represents Ca, Sr or Ca and Sr, x and y satisfy the following relations, $0.5 \leq x \leq 1$, and $0.05 \leq y \leq 0.15$. Further, the present invention provides a vacuum ultraviolet ray-excited light-emitting device using the said phosphor.

DETAILED DESCRIPTION OF THE PREFERRED EMBODIMENT

The present invention will be illustrated in detail below.

As the vacuum ultraviolet ray-excited light-emitting blue phosphor, $BaMgAl_{10}O_{17}$:Eu is widely known. The substrate oxide $BaMgAl_{10}O_{17}$ is a compound having a structure of β alumina type wherein a part of aluminum ions of a spinel layer contained in the β alumina type structure is substituted with magnesium ions. A phosphor obtained by adding Eu as an activator to compounds represented by formula $Ba_{1-0.25y}Mg_{1-y}Al_{10+y}O_{17+0.25y}$ having lower magnesium content and higher aluminum content than $BaMgAl_{10}O_{17}$, particularly to a compound in which y is 0.05 to 0.15 has high brilliance and is useful as a vacuum ultraviolet ray-excited light-emitting phosphor.

Since up to half of Ba in the above-mentioned composition formula can be substituted by Ca, Sr, or Ca and Sr, the phosphor of the present invention is a vacuum ultraviolet ray-excited light-emitting phosphor comprising a compound represented by formula $(Ba_xM_{1-x})_{1-0.25y}Mg_{1-y}Al_{10+y}O_{17+0.25y}$ (wherein, M represents Ca and/or Sr, $0.5 \leq x \leq 1$, and $0.05 \leq y \leq 0.15$) as a substrate, and Eu as an activator. Regarding the range of y, preferably $0.1 \leq y \leq 0.15$.

The content of Eu is preferably from 1 to 30 mol %, more preferably from 5 to 20 mol %, further preferably from 8 to 15 mol % based on the total molar amount of Ba, M (M represents Ca, Sr or Ca and Sr) and Eu. When the content of Eu is less than 1 mol % or more than 30 mol % based on the total molar amount of Ba, M and Eu, high light-emitting brilliance may not be obtained sometimes.

The vacuum ultraviolet ray-excited light-emitting phosphor can also be applied to phosphors excited by ultraviolet ray, X-ray and electronbeam out of the vacuumultraviolet range, and to elements using the same.

The method for producing a phosphor of the present invention is not particularly restricted, and for example, a phosphor can be produced by known methods such as a method described in JP-A No. 10.153760. In general, raw materials can be compounded to give a given composition and calcined to produce a phosphor.

The phosphor of the present invention can be obtained by a method in which raw materials are weighed to give a given composition, mixed using a ball mill, V shape mixing machine, stirring apparatus or the like, then, calcined at temperatures from 900 to 1600° C. for 1 to 50 hours.

As aluminum source, there can be used alumina having high purity (purity: 99.9% or more) (the crystal form may be α alumina or transition alumina), aluminum hydroxide, aluminum nitrate or aluminum halide having high purity (purity: 99% or more), and the like.

As barium source, there can be used those which can be decomposed at higher temperatures to become barium oxide such as barium hydroxide, barium carbonate, barium nitrate, barium halide or barium oxalate having high purity (purity:

99% or more) and the like, or barium oxide having high purity (purity: 99% or more).

As calcium source, there can be used those which can be decomposed at higher temperatures to become calcium oxide such as calcium hydroxide, calcium carbonate, calcium nitrate, calcium halide or calcium oxalate having high purity (purity: 99% or more) and the like, or calcium oxide having high purity (purity: 99% or more).

As strontium source, there can be used those which can be decomposed at higher temperatures to become strontium oxide such as strontium hydroxide, strontium carbonate, strontium nitrate, strontium halide or strontium oxalate having high purity (purity: 99% or more) and the like, or strontium oxide having high purity (purity: 99% or more).

As magnesium source, there can be used those which can be decomposed at higher temperatures to become magnesium oxide such as magnesium hydroxide, magnesium carbonate, magnesium nitrate, magnesium halide, magnesium oxalate or basic magnesium carbonate having high purity (purity: 99% or more) and the like, or magnesium oxide having high purity (purity: 99% or more).

As europium source, there can be used those which can be decomposed at higher temperatures to become europium oxide such as europium hydroxide, europium carbonate, europium nitrate, europium halide or europium oxalate having high purity (purity: 99.9% or more) and the like, or europium oxide having high purity (purity: 99% or more).

When those which can be decomposed at higher temperatures to become oxides such as hydroxides, carbonates, nitrates, halides, oxalates and the like are used as raw materials, raw materials can also be temporary calcined at temperatures from 600 to 800° C. before the main calcination. As the calcination atmosphere in this case, a weak reductive atmosphere is preferable to obtain divalent Eu. Further, it is also possible that raw materials are calcined under an air atmosphere, then, calcined again under a weak reductive atmosphere. For promoting the reaction, flux can also be added. For enhancing crystallinity of a phosphor, re-calcination can also be effected, if necessary.

A powder of a phosphor obtained by the above-mentioned method can be ground by using a ball mill, jet mill and the like, further, can also be washed or classified, if necessary.

The vacuum ultraviolet ray-excited light-emitting phosphor of the present invention is obtained by the above-mentioned method and the like. Under current condition, $BaMgAl_{10}O_{17}$:Eu is used as a vacuum ultraviolet ray-excited light-emitting blue phosphor, however, the phosphor of the present invention comprising a compound represented by formula $(Ba_xM_{1-x})_{1-0.25y}Mg_{1-y}Al_{10+y}O_{17+0.25y}$ (wherein, M represents Ca and/or Sr, $0.5 \leq x \leq 1$, and $0.05 \leq y \leq 0.15$) as a substrate, and Eu as an activator manifests higher light-emitting brilliance than $BaMgAl_{10}O_{17}$:Eu when excited by vacuum ultraviolet ray, and consequently, is suitable for PDP, rare gas lamp and the like.

PDP using a vacuum ultraviolet ray-excited light-emitting phosphor of the present invention can be produced by known methods as disclosed, for example, in JP-A No. 10-195428. Blue, green and red phosphors for a vacuum ultraviolet ray-excited light-emitting device, are mixed, for example, with a binder composed of a polymer compound such as a cellulose-based compound, polyvinyl alcohol and the like, and an organic solvent, to prepare phosphor pastes. The pastes are applied by a method such as screen printing and the like on the partition surface and substrate surface in the form of stripe equipped with an address electrode and compartmented with a partition on the inner surface of a rear substrate, and the applied pastes are dried to form respective phosphor layers. On the layers, a surface glass substrate equipped with a transparent electrode and a bus electrode along direction crossing the phosphor layers and provided with a dielectric layer and a protective layer on the inner side is overlapped, and adhered. The gas inside is exhausted and the inside space is filled with a rare gas of lower pressure such as Xe, Ne and the like to form an electric discharging space. Thus, PDP can be produced.

According to the present invention, a phosphor having high light-emitting brilliance, suitable for a vacuum ultraviolet ray-excited light-emitting device such as PDP, rare gas lamp or the like, is obtained, and a vacuum ultraviolet ray-excited light-emitting device having high brilliance can be realized, therefore the present invention is extremely useful industrially.

EXAMPLES

Then the following examples will illustrate the present invention further in detail, but do not limit the scope of the present invention.

Example 1

Aluminum hydroxide, barium oxalate, magnesium oxalate and europium oxalate were weighed at a molar ratio of constituent ions of Al:Ba:Mg:Eu= 10.10:0.8775:0.900:0.0975, stirred and mixed for one hour in isopropanol, then, a mixed powder was recovered by evaporation. The resulted mixed powder was calcined at 1450° C. for 2 hours on an alumina boat in a reductive atmosphere of a mixed gas of argon and hydrogen (containing 2 vol % of hydrogen), then, cooled gradually to room temperature. The X-ray diffraction of the resulted powder was measured. As a result, the X-ray diffraction pattern was of single phase of β alumina type, and production of a blue light-emitting phosphor was confirmed in which 10 mol % of Ba had been substituted by Eu in a solid solution compound of the composition formula $Ba_{0.975}Mg_{0.9}Al_{10.1}O_{17.025}$, namely, composition formula $(Ba_xM_{1-x})_{1-0.25y}Mg_{1-y}Al_{10+y}O_{17+0.25y}$ (wherein, x=1, and y=0.1), namely, in which Eu was contained in 10 mol % based on the total molar amount of Ba and Eu. The resulted blue phosphor was placed in a vacuum chamber and kept under vacuum of 6.7 Pa ($5 \times 10^{-2}$ torr), and irradiated with vacuum ultraviolet ray using an excimer 146 nm lamp (H0012 type manufactured by Ushio Inc.). As a result, blue light emission was shown and brilliance was as high as 28 cd/m².

Comparative Example 1

A powder was obtained in the same manner as in Example 1 except that the molar ratio of constituent ions was Al:Ba:Mg:Eu=10.00:0.900:1.00:0.100. The X-ray diffraction of the resulted powder was measured in the same manner as in Example 1, as a result, it was a blue phosphor in which 10 mol % of Ba had been substituted by Eu in a compound of the composition formula $BaMgAl_{10}O_{17}$, namely, composition formula $(Ba_xM_{1-x})_{1-0.25y}Mg_{1-y}Al_{10+y}O_{17+0.25y}$ (wherein, x=1 and y=0), namely, in which Eu was contained in 10 mol % based on the total molar amount of Ba and Eu. The resulted blue phosphor was placed in a vacuum chamber and kept under vacuum of 6.7 Pa ($5 \times 10^{-2}$ torr), and irradiated with vacuum ultraviolet ray using an excimer 146 nm lamp (H0012 type manufactured by Ushio Inc.). As a result, blue light emission was shown and brilliance was suppressed to as low as 19 cd/m².

Comparative Example 2

A powder was obtained in the same manner as in Example 1 except that the molar ratio of constituent ions was Al:Ba:Mg:Eu=10.20:0.855:0.800:0.095. The X-ray diffraction of the resulted powder was measured in the same manner as in Example 1, as a result, the X-ray diffraction pattern was of single phase of β alumina type, and production of a blue phosphor was confirmed in which 10 mol % of Ba had been substituted by Eu in a solid solution compound of the composition formula $Ba_{0.95}Mg_{0.8}Al_{10.2}O_{17.05}$, namely, composition formula $(Ba_xM_{1-x})_{1-0.25y}Mg_{1-y}Al_{10+y}O_{17+0.25y}$ (wherein, x=1, and y=0.2) namely, in which Eu was contained in 10 mol % based on the total molar amount of Ba and Eu. The resulted blue phosphor was placed in a vacuum chamber and kept under vacuum of 6.7 Pa ($5\times10^{-2}$ torr), and irradiated with vacuum ultraviolet ray using an excimer 146 nm lamp (H0012 type manufactured by Ushio Inc.). As a result, blue light emission was shown and brilliance was as high as 23 cd/m².

What is claimed is:

1. A vacuum ultraviolet ray-excited light-emitting phosphor comprising a compound represented by formula $(Ba_xM_{1-x})_{1-0.25y}Mg_{1-y}Al_{10+y}O_{17+0.25y}$ as a substrate, and Eu as an activator, wherein M represents Ca, Sr, or Ca and Sr, x and y satisfy the following relations, $0.5\leq x\leq 1$, and $0.05\leq y\leq 0.15$.

2. The vacuum ultraviolet ray-excited light-emitting phosphor according to claim 1, wherein the content of Eu is from 1 to 30 mol % based on the total molar amount of Ba, M and Eu, wherein M represents Ca, Sr, or Ca and Sr.

3. A vacuum ultraviolet ray-excited light-emitting device obtained by using the phosphor according to claim 1.

4. A vacuum ultraviolet ray-excited light-emitting device obtained by using the phosphor according to claim 2.

* * * * *